United States Patent Office 3,284,799
Patented Nov. 8, 1966

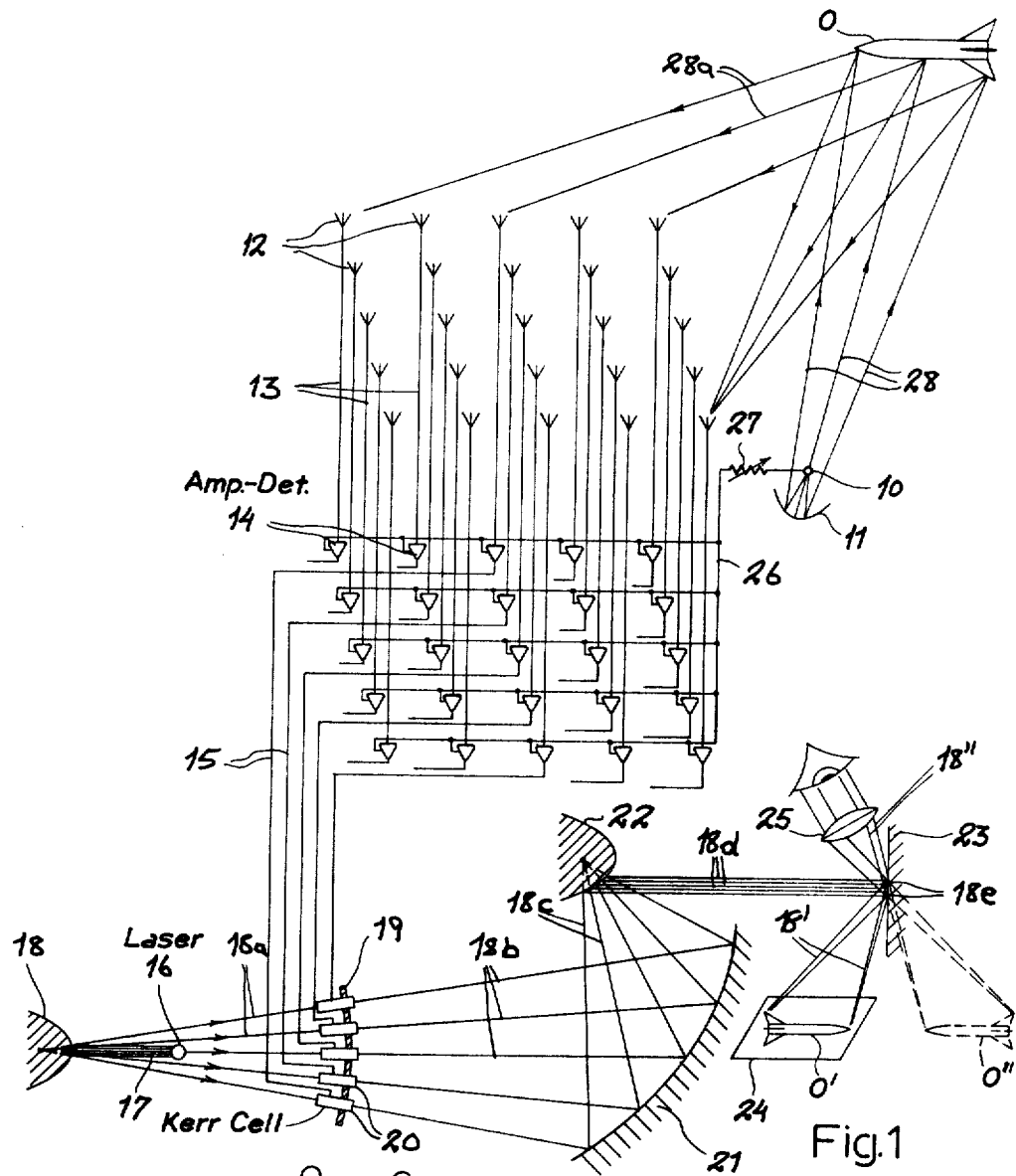
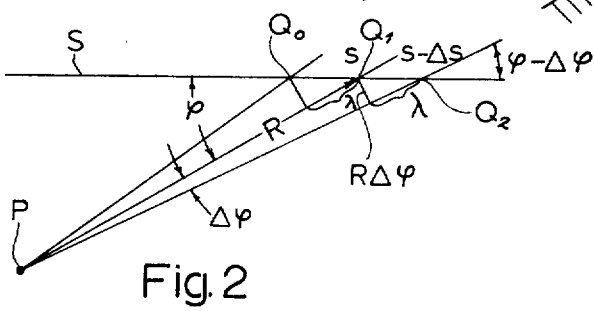
Fig.1
Fig.2
Karl F. Ross
INVENTOR.

3,284,799
WAVE-FRONT-RECONSTRUCTION RADAR SYSTEM
Karl F. Ross, 5121 Post Road, Riverdale, N.Y.
Filed June 10, 1965, Ser. No. 462,913
7 Claims. (Cl. 343—6)

My present invention relates to a radar system and has as its principal aim the provision of means in such system for making directly visible, as a projected real image or an observed virtual image, an object or scene detected by received echoes of emitted high-frequency electromagnetic radiation.

An ancillary object of this invention is to provide means for achieving this result instantaneously, i.e. without periodic sweeping of a radar beam across a region to be observed.

In the field of optics, there has recently been developed a technique known as wave-front-reconstruction photography which utilizes a beam of coherent light, such as one produced by a laser, to generate on a photosensitive surface a wave pattern (termed a hologram) which results from the interference of a beam of reflected light, cast by a scene to be photographed, with a reference beam from the same source, both beams being unfocused. Upon subsequent translumination of the developed wave pattern by a similar monochromatic beam, the object originally photographed becomes visible at an angle of view corresponding to the angle of incidence of the reflected beam upon the receiving surface. More particularly, a first-order wave front due to diffraction at the hologram gives rise to a projectable real image whereas a conjugate first-order wave front, symmetrical to the former, produces a virtual image.

In accordance with my present invention I utilize this principle for translating a pattern of echoes of electromagnetic radiation, as intercepted by an array of radiation receivers such as dipoles, into a geometrically similar hologram by individually controlling an array of electro-optical transducers, such as Kerr cells, disposed in the path of a coherent light beam. The multiplicity of individually intensity-controlled pencils of light emerging from these transducers are then projected onto a receiving surface of light-scattering character to produce thereon a pattern of light spots whose mutual spacing should be related to that of the radiation receivers in substantially the same ratio as the wavelength of the coherent light beam to that of the reflected electromagnetic radiation whereby an image of a radiation-reflecting object can be observed at an angle of view which is related to the angle of incidence of the echoes from this object.

The array of radiation receivers is preferably planar since otherwise, i.e. if this array were curved, the receiving surface would have to be similarly curved with a proportionately reduced radius. As the wave-front-reconstruction principle operates most effectively with acute angles of incidence in a range of roughly 30° to 60°, this array should be so oriented that its plane includes such an angle with the expected direction of reflected radiation. Thus, according to circumstances, the array may be disposed on level ground, on a slope or even on a tiltable structure.

A prerequisite of operativeness of such a system is that the electromagnetic radiation as well as the light beam be of a coherent nature, this term encompassing both monochromaticity and a cophasal relationship of all the radiation components emitted by the respective source. The term is not intended to imply continuity in time since, as will be apparent, an image can also be obtained if the emitted radiation is pulsed. It should further be understood that the term "light," in the present context, is not confined to the visible spectrum inasmuch as invisible rays in either the infrared or the ultra-violet range can give rise to a visible image through interposition of a suitable translater such as a photographic camera or a televiewer with an iconoscope of proper sensitivity.

The invention will be described hereinafter in greater detail, reference being made to the accompanying drawing in which:

FIG. 1 is an overall diagrammatic view of a radar system embodying the features discussed above; and FIG. 2 is a graph illustrating certain aspects of wave-front reconstruction.

In FIG. 1 I have shown an emitter 10 of coherent electromagnetic radiation, e.g. a maser, provided with a reflector 11 as a means for concentrating the radiation into a beam 28 of desired width. A distant object 0, such as a missile, reflects the high-frequency radiation in the form of echoes 28a toward a planar array of dipoles 12 which, in practice, may be considerably more numerous than has been illustrated. A transmission circuit, shown as a line 13, individually extends from each dipole 12 to a respective amplifier-detector 14 acting as a phase discriminator. Another transmission circuit 26 leads from emitter 10 to a second input of each amplifier-detector 14 to provide a reference oscillation to be algebraically combined with the echo oscillation arriving over the corresponding lead 13, an adjustable impedance 27 serving to make the amplitude of this reference oscillation substantially equal to the peak amplitude of the echo oscillation so that the resultant oscillation detected by the element 14 has an amplitude depending upon the relative phase of the two component oscillations. Discriminator 14 is provided with an output circuit indicated at 15. The elements 14 are shown for convenience as being distributed in a pattern corresponding to that of the radiation receivers 12 though in practice the geometrical location of these elements is without significance.

A laser 16 generates a narrow beam 17 of monochromatic light which irradiates a parabolically convex mirror 18 to produce a spreading beam 18a. This beam is intercepted by an opaque wall 19 traversed by an array of Kerr cells 20, shown only in part, whose geometrical disposition is similar to that of the radiation receivers 12. The electrooptical transducers 20 have inputs connected to the output leads 15 of respective discriminators 14 so as individually to modulate the intensity of corresponding pencils of light 18b emerging from these cells. The pencils 18b are reflected by an elliptically concave mirror 21, the surface of this mirror being part of an ellipsoid having one focal point at the focus of the paraboloidal mirror 18 and having its other focal point at the focus of a similarly paraboloidal convex mirror 22. The latter mirror redirects the converging pencils 18c into a parallel or telecentric bundle 18d which impinges upon a receiving surface 23 to produce thereon a pattern of light spots 18e akin to a conventional hologram. The mirrors 18, 21, 22 constitute an afocal catoptric system whose magnification ratio should be so chosen, for reasons explained hereinafter with reference to FIG. 2, that the spacing of the pencils 18d (and therefore of dots 18e) is related to the spacing of dipoles 12 in substantially the same ratio as is the wavelength of the light of laser 16 to that of the high-frequency radiation 28 originating at emitter 10.

The light scattered at the surface 23 gives rise to two first-order wave fronts which form a bundle of convergent light rays 18' and a symmetrically oriented bundle of divergent light rays 18". Light rays 18' project a real image 0' of object 0 onto a viewing surface 24; light rays 18" create a virtual image 0" beyond receiving surface 23, this virtual image being viewable by the eye of an observer either directly or through the intermediary of an eyepiece shown diagrammatically at 25.

Reference will now be made to FIG. 2 for an explanation of certain concepts involved in the creation of a hologram. Let a point P reflect incident coherent radiation (e.g. radio waves or light), of fixed wavelength $\lambda$, onto a surface S at an angle of incidence $\varphi$, the distance of point P from a point of incidence $Q_1$ on surface S being $R \gg \lambda$. Other points of incidence $Q_0$ and $Q_2$ represent locations whose distance from P differs by $\pm \lambda$ from R, hence the reflected radiation will be in phase at all three points $Q_0$, $Q_1$ and $Q_2$. When this phase is detected, as by comparison with a reference wave of the same frequency in the manner described hereinabove, there emerges a pattern of oscillations whose amplitude will be substantially identical at locations $Q_0$, $Q_1$ and $Q_2$; it may be assumed for present purposes that these amplitudes are at a maximum at the points $Q_0$, $Q_1$ and $Q_2$. If, now, the spacing of consecutive peaks at $Q_0$ and $Q_1$ is designated $s$ and that at $Q_1$ and $Q_2$ is designated $s - \Delta s$, and if the angle $Q_1 P Q_2$ is designated $\Delta \varphi \ll \varphi$, then it can be shown that $\cos \varphi \approx \lambda / s$ and that $$R \approx (s \sin \varphi)/\Delta \varphi \approx s^2/(k \Delta s)(s/\lambda - \lambda/s)$$

whence the angle of incidence can be determined from the magnitude of $s$ in relation to wavelength $\lambda$ whereas the distance R is a function of the increment $\Delta s$. It follows then that, in the observed image, angle $\varphi$ will be preserved and the magnitude of R will be proportionally reduced if the ratio $s/\lambda$ remains the same in the array of receivers 12 and in the hologram produced by light spots 18e.

By the same token it will be apparent that minor departures from this ratio will result in a slight distortion of the image but will not necessarily make the system inoperative.

The total number of radiation receivers 12, and thus also that of phase discriminator 14 and electro-optical transducers 20, determines the degree of resolution of the resultant image. If the beam of radiation 28 were shifted into a different direction, the positions and contents of the images O' and O'' would similarly change; if the radiation from emitter 10 were transmitted omnidirectionally, the images would have panoramic character.

I claim:

1. A radar system comprising an emitter of coherent high-frequency electromagnetic radiation; an array of receivers for echoes of said radiation spaced apart by less than the wavelength of said radiation; a source of a beam of coherent light; an array of electrooptical transducers disposed in the path of said beam for dividing the latter into a multiplicity of pencils of individually adjustable intensity, the disposition of said transducers being geometrically similar to that of said receivers; circuit means individually connecting the output of each of said receivers together with a reference output from said emitter to an input of a corresponding one of said transducers for controlling the intensity of the respective pencil; and projection means for directing said pencils onto a receiving surface with formation thereon of a pattern of light spots whose relative spacing is related to that of said receivers in substantially the same ratio as the wavelength of said light to that of said radiation whereby an image of an object reflecting said radiation is observable at an angle of view related to the angle of incidence of said echoes.

2. A system as defined in claim 1 wherein said source is a laser.

3. A system as defined in claim 2 wherein said projection means comprises an afocal combination of components including a first divergent component ahead of said array of transducers, a convergent component beyond said array of transducers and a second divergent component beyond said second converging component.

4. A system as defined in claim 3 wherein said components are mirrors.

5. A radar system comprising an emitter of coherent high-frequency electromagnetic radiation; a planar array of receivers for echoes of said radiaton equispaced by less than the wavelength of said radiation; a source of beams of coherent light; an array of equispaced electro-optical transducers disposed in the path of said beam for dividing the latter into a multiplicity of pencils of individually adjustable intensity, the disposition of said transducers being geometrically similar to that of said receivers; circuit means individually connecting the output of each of said receivers together with a reference output from said emitter to an input of a corresponding one of said transducers for controlling the intensity of the respective pencil; and projection means for directing said pencils onto a flat receiving surface with formation thereon of a pattern of light spots whose relative spacing is related to that of said receivers in substantially the same ratio as the wavelength of said light to that of said radiation whereby an image of an object reflecting said radiation is observable at an angle of view related to the angle of incidence of said echoes.

6. A radar system comprising an emitter of coherent high-frequency electromagnetic radiation; an array of receivers for echoes of said radiation spaced apart by less than the wavelength of said radiation; a source of a beam of coherent light; an array of electrooptical transducers disposed in the path of said beam for dividing the latter into a multiplicity of pencils of individually adjustable intensity, the disposition of said transducers being geometrically similar to that of said receivers; phase-discriminator means individually connected to receive the output of each of said receivers for controlling the intensity of the respective pencil by applying a phase-dependent voltage to the corresponding transducers; and projection means for directing said pencils onto a receiving surface with formation thereon of a pattern of light spots whose relative spacing is related to that of said receivers in substantially the same ratio as the wavelength of said light to that of said radiation whereby an image of an object reflecting said radiation is observable at an angle of view related to the angle of incidence of said echoes.

7. A radar system comprising an emitter of coherent high-frequency electromagnetic radiation; a planar array of receivers for echoes of said radiation equispaced by less than the wavelength of said radiation; a source of beams of coherent light; an array of equispaced electrooptical transducers disposed in the path of said beam for dividing the latter into a multiplicity of pencils of individually adjustable intensity, the disposition of said transducers being geometrically similar to that of said receivers; phase-discriminator means individually connected to receive the output of each o fsaid receivers for controlling the intensity of the respective pencil by applying a phase-dependent voltage to the corresponding transducers; and projection means for directing said pencils onto a flat receiving surface with formation thereon of a pattern of light spots whose relative spacing is related to that of said receivers in substantially the same ratio as the wavelength of said light to that of said radiation whereby an image of an object reflecting said radiation is observable at an angle of view related to the angle of incidence of said echoes.

No references cited.

CHESTER L. JUSTUS, *Primary Examiner.*

D. C. KAUFMAN, *Assistant Examiner.*